United States Patent
Niessner et al.

[11] Patent Number: 6,160,050
[45] Date of Patent: Dec. 12, 2000

[54] POLYMER-MODIFIED STARCH, METHOD FOR ITS PRODUCTION, AND ITS USE

[75] Inventors: Manfred Niessner, Schifferstadt; Claudia Nilz, Rödersheim-Gronau; Primoz Lorencak, Ludwigshafen; Martin Rübenacker, Altrip; Roland Ettl, Hassloch, all of Germany

[73] Assignee: BASF Aktiengesellschaft, Ludwigshafen, Germany

[21] Appl. No.: 09/341,137

[22] PCT Filed: Jan. 16, 1998

[86] PCT No.: PCT/EP98/00232

§ 371 Date: Jul. 14, 1999

§ 102(e) Date: Jul. 14, 1999

[87] PCT Pub. No.: WO98/31740

PCT Pub. Date: Jul. 23, 1998

[30] Foreign Application Priority Data

Jan. 17, 1997 [DE] Germany .......................... 197 01 524

[51] Int. Cl.[7] .................................................. C08F 116/06
[52] U.S. Cl. ...................................... 525/54.26; 525/54.24
[58] Field of Search ............................... 525/54.24, 54.26

[56] References Cited

U.S. PATENT DOCUMENTS

| | | | |
|---|---|---|---|
| 3,467,608 | 9/1969 | Dishburger et al. | 167/168 |
| 3,642,572 | 2/1972 | Endres et al. | 162/164.2 |
| 3,734,820 | 5/1973 | Hoover et al. | 162/168 |
| 4,097,427 | 6/1978 | Attken et al. | 162/169 |
| 4,144,123 | 3/1979 | Scharf et al. | 162/164 R |
| 4,818,341 | 4/1989 | Degen et al. | 162/168.2 |
| 4,880,497 | 11/1989 | Pfohl et al. | 162/168.2 |
| 4,940,514 | 7/1990 | Stange et al. | 162/168.7 |
| 4,978,427 | 12/1990 | Pfohl et al. | 162/168.2 |
| 5,262,008 | 11/1993 | Moench et al. | 162/168.2 |

FOREIGN PATENT DOCUMENTS

| | | |
|---|---|---|
| 747 448 | 11/1966 | Canada . |
| 11 82 826 | 11/1966 | Germany . |
| 976 547 | 11/1964 | United Kingdom . |
| WO 96/13525 | 5/1996 | WIPO . |

OTHER PUBLICATIONS

Ullmanns Encyklopädie der Technischen Chemie, vol. 17, pp. 581–635, "Papier, Herstellung USW" 1979.

Derwent Publications, AN 88–050951, DE 3719–480, Feb. 18, 1988.

G. Tegge, Stärke und Stärkederivate, pp. 157–160, "Amylopektin Und Amylose," 1984.

H. Fikentscher, Cellulose Chemele 13, pp. 58–64, 71, 74, "Systematik Der Cellulosen Auf Grund Inrer Viskosität In Lösung," 1932 (with English Abstract).

*Primary Examiner*—Terressa Boykin
*Attorney, Agent, or Firm*—Oblon, Spivak, McClelland, Maier & Neustadt, P.C.

[57] ABSTRACT

A starch modified with at least one cationic polymer is prepared by a process in which dry, free-flowing starch is initially taken and the cationic polymer is applied thereon without the starch particles sticking together, and the polymer-modified starch is used.

14 Claims, No Drawings

POLYMER-MODIFIED STARCH, METHOD FOR ITS PRODUCTION, AND ITS USE

The present invention relates to starches in undigested or digested form which are modified with polymers which contain cationic groups and/or groups which can be converted into cationic groups, a process for their preparation and their use as assistants in the production of paper, board and cardboard, in particular as dry strength agents for paper.

Ullmanns Encyklopädie der Technischen Chemie, 4th Edition, Verlag Chemie, Weinheim, 1979, Vol. 17, 581 et seq., describes generally the use of digested, water-soluble starches and of water-soluble starch derivatives as assistants for papermaking, in particular for increasing the strength of the paper. However, the retention of the dissolved starches in the paper is low, leading to considerable pollution of the waste waters.

U.S. Pat. No. 3,734,820 describes the use of cationic dextran graft copolymers as additives for improving the dry strength of paper. The graft copolymers are added to an aqueous cellulose dispersion. This mixture is then used for the production of paper sheets. The graft copolymers are prepared by grafting dextran, a naturally occurring polymer having an average molecular weight of from about 20,000 to about 50,000,000, with cationic monomers, for example diallylic, quaternary ammonium compounds, such as diallyldimethylammonium chloride, or acrylic, quaternary ammonium compounds, such as dimethylaminoethyl methacrylate and mixtures thereof with acrylamide or methacrylamide. The graft copolymerization is preferably carried out in the presence of a redox catalyst, for example one based on cerium.

U.S. Pat. No. 3,467,608 describes a process for the preparation of a cationic starch by heating an aqueous starch suspension with the addition of a polyalkyleneimine, eg. polyethyleneimine, or of a polyalkylenepolyamine, such as polyethylenepolyamine, the molecular weight of the polymer used for the modification being at least 50,000. The reaction mixture contains from 0.5 to 40% by weight of the polymer and from 60 to 99.5% by weight of starch, the percentages being based on the solids content. The resulting cationic starch derivatives are used as flocculents.

U.S. Pat. No. 4,097,427 describes a process for converting starch into cationic form, and aqueous starch suspension being reacted under alkaline reaction conditions with a water-soluble polymer which contains quaternary ammonium groups in the presence of an oxidizing agent. Quaternized polyethyleneimines, quaternized diallyldialkylamine polymers, etc. are suitable. For example, ammonium persulfate, hydrogen peroxide, sodium hypochlorite, ozone or tert-butyl hydroperoxide is used as the oxidizing agent. The pH of the starch suspension is brought to about 8 with water-soluble bases. The modified cationic starches thus prepared are added to the paper stock as dry strength agents in papermaking. In this process, however, the waste water has a very high COD value.

U.S. Pat. No. 4,146,515 describes a process for the preparation of a gelatinous, cationic starch for the surface sizing and coating of cellulosic materials. An aqueous suspension of a partly oxidized starch, together with a cationic polymer, is digested in a continuous digester. The cationic polymers used are condensates of epichlorohydrin and dimethylamine, polymers of diallyldimethylammonium chloride, quaternized reaction products of vinylidene chloride and ammonia, quaternized polyethyleneimine and quaternized polyepichlorohydrin.

DE-A-37 19 480 and EP-A-0 282 761 describe a process for the production of paper, board and cardboard having high dry strength by adding a dry strength agent comprising a mixture of cationic polymers and starch to the paper stock. The cationic polymers contain polymerized units of diallyldimethylammonium chloride, N-vinylamine or N-vinylimidazoline as characteristic monomers. It is also possible to use polyethyleneimine as the cationic polymer. For the preparation of the dry strength agents, either an aqueous suspension or a natural potato starch is digested in the presence of the polymers by heating to above the glutinization temperature in the absence of oxidizing agents, polymerization initiators and alkalis or a digested potato starch is reacted with cationic polymers at from 15 to 70° C. The starch used is exclusively natural or thermally degraded potato starch and the modification with the cationic polymers is carried out in aqueous suspension or in aqueous solution.

A similar disclosure is made by EP-A-0 301 372, cationically modified, enzymatically degraded starches being used.

U.S. Pat. Nos. 4,880,497 and 4,978,427 describe water-soluble copolymers which contain vinylamine units and their use as wet strength agents and dry strength agents for paper. The polymers are prepared by copolymerization of N-vinylformamide and an ethylenically unsaturated monomer selected from vinyl acetate, vinyl propionate, alkyl vinyl ethers, esters, nitriles and amides of acrylic and methacrylic acid and N-vinylpyrrolidone and subsequent hydrolysis of from 30 to 100 mol-% of the formyl groups of the resulting copolymer with formation of amino groups. The hydrolyzed copolymers are used for papermaking in amounts of from 0.1 to 5% by weight, based on dry fibers.

EP-A-0 418 343 likewise describes a process for the production of paper, board and cardboard by draining a paper stock in the presence of polymers containing N-vinylformamide units. Unhydrolyzed copolymers which contain, as polymerized units, N-vinylformamide and at least one further monomer containing cationic groups selected from the group consisting of (meth)acrylamide having alkyleneammonium radicals or from the group consisting of the diallyldialkylammonium compounds are used. To achieve good retention with respect to paper fibers when these copolymers are used as dry strength agents for paper, an aqueous solution which was prepared beforehand by heating the aqueous copolymers together with natural potato starch to above the glutinization temperature of the starch in the absence of oxidizing agents, polymerization initiators and alkalis is added to the paper stock.

WO 96/13525 describes a process for the cationic modification of starch by reacting various natural starches and waxy starches with polymers which contain amino and/or ammonium groups. The reaction is carried out in aqueous solution at elevated temperatures and superatmospheric pressure in the absence of oxidizing agents, polymerization initiators and alkalis, the starch being substantially digested and only a small decrease in molecular weight of not more than 10% by weight of the starch taking place. The cationic starches thus obtained are used as dry strength agents in papermaking.

In the process as described above for the preparation of starch modified with cationic polymers, the polymer is added to an aqueous suspension of a natural starch or to a solution of a degraded starch, it being possible for the modification to be effected simultaneously with the digestion of the starch. None of the abovementioned publications indicates the addition of a cationic polymer to a starch present in dry form in order to obtain a solid, preferably pulverulent intermediate which can then be subjected to a separate digestion.

In general, the modification and the digestion of the starch are carried out not by the producer but by the user, for example the paper maker. Storage and transport of the components and the metering of the cationizing agent often turn out to be time-consuming and expensive for the customer. It is an object of the present invention to provide suitably compounded undigested modified starches for the user, for example in powder form. After digestion by the consumer, these intermediates suitable as a commercial form should give digested, modified starches which have good properties when used as assistants in papermaking, in particular as dry strength agents.

We have found, surprisingly, that this object is achieved if cationic polymers are applied to a dry, free-flowing starch.

The present invention therefore relates to a process for the preparation of starch which is modified with at least one cationic polymer, wherein the dry, free-flowing starch is present and the cationic polymer is applied thereon without causing the starch particles to stick together.

In the novel process, the starch is used in dry, pulverulent, essentially anhydrous form for the modification. Essentially anhydrous is also understood as meaning starches having a residual water content usual for natural products or for derivatives of natural products. A single starch or a mixture of different starch grades, as described in more detail below, may be used.

When they are added to the starches, the cationic polymers may be present in solid, suspended or dissolved form. Preferably, a finely divided solution of the cationic polymer is added to the initially taken starch powder with simultaneous mixing. An aqueous solution of the cationic polymers is preferred. Also, if required, solutions in a mixture of water and a water-miscible solvent may be used. The polymer in the solution generally is from about 0.05 to 75, preferably 0.5 to 50, in particular from 1 to 30, % by weight.

The weight ratio of starch to cationic polymer is in general from about 1:0.0005 to 1:2, preferably from about 1:0.001 to 1:1.

For the preparation of the novel starches modified with cationic polymers, a solution of the polymers is preferably added to the starches, thoroughly mixed and dried simultaneously or after the mixing, so that a solid or preferably dry (except for residual moisture present) and in particular a free-flowing, pulverulent or granular product is obtained. Preferably the drying and/or the modification of the starch is carried out with a supply of heat. The preparation can be effected in general with conventional apparatuses, such as closed containers having mixing apparatuses, for example rotatable tubes or drums. The polymer solution is preferably added in very finely divided form to the dry, essentially anhydrous starch.

Preferably, the preparation, i. e. the modification and/or the drying, of the novel starches modified with cationic polymers is carried out in a mixing device, a device for spray drying or spray granulation or in a fluidized bed. Here, solutions of the cationic polymers are sprayed in finely divided form onto the starch, for example with the use of nozzles, and the resulting mixture is dried. Processes for spray-drying or spray-granulation are known to a person skilled in the art. In the present case, solid products can be obtained, for example, in spray towers of conventional design. If necessary, inert gases, for example nitrogen, may be used as drying gases and are passed countercurrent to, or preferably concurrent with, the polymer that drops through the drying tower. Furthermore, intensive mixers are suitable for modifying and/or compounding the novel starches, starch being initially taken as a fluidized bed. The polymer solution may then be sprayed into the mixer by means of a suitable apparatus, for example a nozzle lance. Mixers suitable for this process are, for example, the intensive mixers from Eirich, Hardheim. The modification and drying of the starch are carried out in general at from 10 to 130° C., preferably from 20 to 100° C. The polymer modification can be carried out under reduced, atmospheric or superatmospheric pressure. In general, the modification is effected at from 0.001 to 2, preferably from 0.1 to 1, bar. The duration of the modification is from about 0.25 to 5, preferably from 0.5 to 3 hours per kg of starch.

If the preparation of the cationically modified starches is carried out by spray-drying or spray-granulation, the resulting solid may be separated in a conventional manner from the gas stream, for example by a cyclone.

The preparation of the modified starches is preferably carried out in a closed container having a mixing apparatus, in particular a rotatable tube or drum, in which the dry, free-flowing starch is initially taken and a finely divided solution of the polymer is added with thorough mixing. The polymer solution is preferably added with atomization.

In a further preferred embodiment of the novel process, the starch is initially taken in the form of a fluidized bed in the container used for the modification, and the polymer solution is sprayed into the container. The amount of starch used for the modification should be chosen so that easy fluidization is permitted.

As a result of the process measures described above, the starch essentially does not stick together on application of the cationic polymers.

The present invention furthermore relates to the solid starches obtained by the novel process and modified with cationic polymer. Advantageously, these are pulverulent or granular and are suitable as intermediates and commercial forms for sale to further processing operations. Since they are essentially free of water and other solvents, transport to the user and storage until use are economical. Metering of the cationic modifiers by the user is dispensed with.

The present invention furthermore relates to the digestion of the preferably essentially anhydrous, cationically modified starches described above. Processes for the digestion of starches are known to a person skilled in the art. Thus, WO 96/13525 describes a process for the digestion of cationically modified starches, where, in contrast to the present invention, an aqueous starch suspension is modified with cationic polymers and is simultaneously digested in a one-stage process at elevated temperatures and superatmospheric pressure. The digestion conditions stated in this publication are hereby incorporated by reference.

Starch digestion is generally understood as meaning the conversion of the solid starch grains into water-soluble form, superstructures (helix formation, intermolecular H-bridges etc.) being eliminated without there being any substantial degradation of the amylose and amylopectin units forming the starch to give oligosaccharides or glucose. For the digestion, for example aqueous suspensions or solutions of the abovementioned cationically modified starches are heated to temperatures which are generally above the glutinization temperature of the starches. The temperature is in general from about 60 to 180° C., preferably 65 to 150° C., in particular 70 to 110° C. The digestion can be carried out under ambient pressure or under superatmospheric pressure. In a preferred embodiment of the novel process, the digestion is effected at from 1.0 to 10.0, preferably from 1.2 to 7.9 bar. Furthermore, the starch digestion is preferably carried out under the action of shear forces on the suspension or solution, for example by stirring at a speed of from about 100 to 2000 rpm, preferably from 200 to 1000 rpm.

In a particularly preferred embodiment of the novel process, the starch digestion takes place at above 100° C., preferably at from 105 to 170° C., at superatmospheric pressure of from about 1.2 to about 7.9 bar and the simultaneous rigorous stirring during a short residence time. Under thee digestion conditions, the degradation rate with respect to the molecular weights of the cationically modified starches used is low. Thus, the molecular weight of the modified starches is generally reduced by not more than 20%, preferably not more than 10%. The reaction can be carried out in the conventional apparatuses in which starch is digested in industry. At above about 100° C., the reaction has to be carried out in pressure-resistant apparatuses, for example pressure-resistant stirred kettles, autoclaves, kneaders, jet digesters, extruders, etc . . .

The starches for carrying out the digestion are dissolved in water or in a water-containing solvent, preferably in the absence of oxidizing agents, polymerization initiators and alkalis. The required contact time depends on the temperature used. In general, the digestion of the starch is carried out over a period of from 0.1 minute to 6 hours, preferably from about 3 minutes to 5 hours, particularly preferably from about 5 to 30 minutes. If the digestion is carried out at relatively high temperatures, for example at above 100° C., shorter contact times, for example from about 0.1 to 15 minutes are generally required.

For the starch digestion, if desired, additives which support the digestion of the starch and additives which influence the molecular weight of the starch, for example acids or further paper assistants may be added.

The present invention furthermore relates to the digested, cationically modified starches obtainable by a digestion as described above.

In general, polymers which contain cationic groups or groups which can be converted into cationic groups are suitable for the novel process. Such groups are derived in general from heteroatoms, such as, N, P, O, S etc., which are capable of forming stable cations, for example after reaction with an acid or with an alkylating agent. Polymers which contain amino and/or ammonium groups are preferred for the novel process. These compounds are also referred to as cationic polymers. Suitable cationic polymers are described in EP-A-0 282 761, EP-A-0 301 372, EP-A-0 418 343 and WO 96/13525, which are hereby fully incorporated by reference.

The suitable cationic polymers contain units of monomers having cationic groups or groups which can be converted into cationic groups, selected from a) N-vinylamines of the formula I

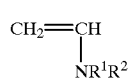

where $R^1$ and $R^2$, independently of one another, are each hydrogen or alkyl;

b) aziridines (alkyleneimines) of the formula II

(II)

where $R^3$ is hydrogen or alkyl;
c) diallyldialkylammonium compounds;
d) N-vinylimidazolines of the formula III

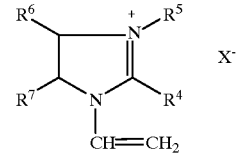

(III)

where
$R^4$ and $R^5$, independently of one another, are each hydrogen, alkyl, aryl or alkylaryl,
$R^6$ and $R^7$, independently of one another, are each hydrogen or alkyl and
$X^-$ is an opposite ion, preferably selected from $F^-$, $Cl^-$, $Br^-$, $I^-$, $SO_4^{2-}$, $HSO_4^-$, alkyl-$O$-$SO_3H^-$ and $R^8$-COO—, where $R^8$ is a radical selected from alkyl, cycloalkyl, aryl, cycloalkylalkyl and arylalkyl, which may be unsubstituted or substituted;
e) aminoalkyl-substituted esters and amides of acrylic acid and of methacrylic acid of the formula IV

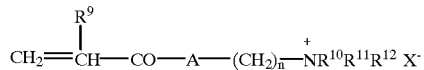

(IV)

where
n is an integer from 1 to 6,
A is O or NH,
$R^9$ is hydrogen or methyl,
$R^{10}$, $R^{11}$ and $R^{12}$ independently of one another, are each hydrogen, alkyl, cycloalkyl, aryl, cycloalkylalkyl or arylalkyl and
$X^-$ has the abovementioned meanings,
and, if required, further comonomers as polymerized units.

In connection with the present invention, the term alkyl means straight-chain and branched alkyl groups. These are preferably straight-chain or branched $C_1$–$C_{18}$-alkyl, in particular $C_1$–$C_8$-alkyl, preferably $C_1$–$C_6$-alkyl or particularly preferably $C_1$–$C_4$-alkyl. Examples of alkyl groups are in particular methyl, ethyl, propyl, isopropyl, n-butyl, 2-butyl, 2-methylpropyl, t-butyl, n-pentyl, 2-pentyl, 3-pentyl, 2-methylbutyl, 3-methylbutyl, 1,2-dimethylpropyl, 1,1-dimethylpropyl, 2,2-dimethylpropyl, n-hexyl, 2-hexyl, 3-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 2-ethylbutyl, 1-ethyl-2-methylpropyl, n-heptyl, 2-heptyl, 3-heptyl, 4-heptyl, 2-ethylpentyl, 2-ethylhexyl, octyl, decyl, dodecyl etc.

Substituted alkyl radicals have preferably 1, 2 or 3 substituents, in particular 1 or 2 substituents in any desired position.

The cycloalkyl group is preferably $C_5$–$C_7$-cycloalkyl, such as cyclopentyl, cyclohexyl or cycloheptyl.

If the cycloalkyl group is substituted, it preferably has 1, 2, 3, 4 or 5, in particular 1, 2 or 3, alkyl radicals as substituents.

Aryl is preferably phenyl or naphthyl, in particular phenyl.

Substituted aryl or cycloalkyl radicals have as substituents, for example, $C_1$–$C_8$-alkyl, $C_1$–$C_8$-alkoxy, halogen, nitro or carboxyl. As a rule, 1, 2 or 3 substituents are preferred.

Arylalkyl is preferably phenyl-$C_1$–$C_4$-alkyl, in particular benzyl or phenethyl.

In a preferred embodiment, the cationic polymers contain polymerized units of N-vinylamines of the formula (I), $R^1$ is hydrogen or alkyl and $R^2$ is hydrogen. Such polymers are obtainable, for example, by complete or partial hydrolysis of homo or copolymers of open-chain N-vinylcarboxamides of the formula (V)

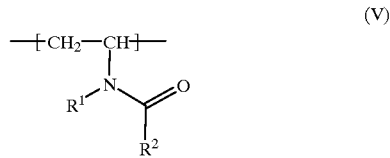

(V)

where $R^1$ and $R^2$, independently of one another, are each hydrogen or $C_1$–$C_6$-alkyl, with elimination of the —$COR^2$ group. Suitable N-vinylcarboxamides are, for example, N-vinylformamide, N-vinyl-N-methylformamide, N-vinyl-N-ethylformamide, N-vinyl-N-propylformamide, N-vinyl-N-isopropylformamide, N-vinyl-N-butylformamide, N-vinyl-N-sec-butylformamide, N-vinyl-N-tert-butylformamide, and N-vinyl-N-pentylformamide. For the preparation of the polymers, these monomers may be polymerized either alone or as mixtures. Homopolymers of N-vinylformamide are preferably used as starting materials.

The hydrolysis of the polymerized N-vinylcarboxamides to give the corresponding amines is carried out by conventional prior art methods in the presence of hydrolysis agents, for example mineral acids, preferably hydrochloric acid and sulfuric acid, or bases, in particular alkali metal and alkaline earth metal hydroxides or ammonia. The hydrolysis in aqueous solution has proven particularly useful.

The hydrolyzed polymers, which contain units of the formula (I), where $R^2$ is hydrogen, have K values of from 15 to 300, preferably from 30 to 200, determined according to H. Fikentscher in 5% strength by weight aqueous sodium chloride solution at pH 7, at 25° C. and at a polymer concentration of 0.5% by weight.

The cationic polymers having polymerized vinylamine units of the formula (I) may contain further comonomer units in addition to N-vinylcarboxamide units of the formula (V).

Preferably, copolymers of vinylamines are used whose comonomers are selected from N-vinylcarboxamides, vinyl alcohol, esters of vinyl alcohol with monocarboxylic acids, α,β-monoethylenically unsaturated mono- and/or dicarboxylic acids and their salts, esters, amides and nitriles, heterocycles having N-vinyl groups, α,β-monoethylenically unsaturated sulfonic acids and their esters, and mixtures thereof.

Cationic polymers which contain
A) from 0.1 to 100 mol-% of polymerized vinylamine units of the formula (I),
B) from 0 to 99.9, preferably from 1 to 99, mol-% of polymerized units of further monoethylenically unsaturated monomers selected from N-vinylformamide, vinyl alcohol, esters of vinyl alcohol with $C_1$–$C_8$-monocarboxylic acids, $C_1$–$C_8$-vinyl ethers, α,β-unsaturated $C_3$–$C_{18}$-mono- and/or $C_4$–$C_{20}$-dicarboxylic acids and their salts or esters, amides and nitriles and N-vinyllactams, and
C) from 0 to 5 mol-% of polymerized monomers having at least two ethylenically unsaturated, nonconjugated double bonds, are preferably used.

Examples of monomers of group B) in addition to the stated N-vinylcarboxamides are, for example, vinyl alcohol, which is obtainable by partial or complete hydrolysis of corresponding vinyl esters, preferably of vinyl acetate, and vinyl esters of saturated carboxylic acids of 1 to 6 carbon atoms, eg. vinyl formate, vinyl acetate, vinyl propionate and vinyl butyrate. Also suitable are unsaturated $C_3$–$C_6$-mono- or dicarboxylic acids, such as acrylic acid, methacrylic acid, maleic acid, crotonic acid, itaconic acid and vinylacetic acid and their alkali metal and alkaline earth metal salts, esters, amides and nitriles, for example methyl acrylate, methyl methacrylate, ethyl acrylate and ethyl methacrylate, or glycol esters or polyglycol esters of ethylenically unsaturated carboxylic acids, in each case only one OH group of the glycols and polyglycols being esterified, eg. hydroxyethyl acrylate, hydroxyethyl methacrylate, hydroxypropyl acrylate, hydroxybutyl acrylate, hydroxypropyl methacrylate, hydroxybutyl methacrylate and the monoesters of acrylic acid with polyalkylene glycols having a molecular weight of from about 1,500 to 10,000. Also suitable are the esters of ethylenically unsaturated carboxylic acids with aminoalcohols, eg. dimethylaminoethyl acrylate, dimethylaminoethyl methacrylate, diethylaminoethyl acrylate, diethylaminopropyl methacrylate, diethylaminopropyl acrylate, dimethylaminopropyl methacrylate, diethylaminopropyl acrylate, diethylaminopropyl methacrylate, dimethylaminobutyl acrylate and diethylaminobutyl acrylate. The basic acrylates are used in the form of free bases, of the salts with mineral acids, such as hydrochloric acid, sulfuric acid and nitric acid, of the salts with organic acids, such as formic acid or benzenesulfonic acid, or in quaternized form. Suitable quaternizing agents are, for example, dimethyl sulfate, diethyl sulfate, methyl chloride, ethyl chloride or benzyl chloride.

Other suitable comonomers B) are unsaturated amides, for example acrylamide, methacrylamide and N-alkylmonoamides and N-alkyldiamides having alkyl radicals of 1 to 6 carbon atoms, such as N-methylacrylamide, N,N-dimethylacrylamide, N-methylmethacrylamide, N-ethylacrylamide, N-propylacrylamide and tert-butylacrylamide, and basic (meth)acrylamides, eg. dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Suitable comonomers B) are also vinyl ethers having alkyl radicals of 1 to 6 carbon atoms, eg. methyl vinyl ether, ethyl vinyl ether, propyl vinyl ether, isopropyl vinyl ether, n-butyl vinyl ether, n-pentyl vinyl ether and n-hexyl vinyl ether, and vinyl ethers having aromatic substituents, eg. phenyl vinyl ether and benzyl vinyl ether.

Other suitable comonomers B) are N-vinylpyrrolidone, N-vinylcaprolactam, acrylonitrile, methacrylonitrile, N-vinylimidazole and substituted N-vinylimidazoles, eg. N-vinyl-2-methylimidazole, N-vinyl-4-methylimidazole, N-vinyl-5-methylimidazole and N-vinyl-2-ethylimidazole, and N-vinylimidazolines, such as vinylimidazoline, N-vinyl-2-methylimidazoline and N-vinyl-2-ethylimidazoline. N-vinylimidazoles and N-vinylimidazolines are used not only in the form of the free bases but also in the form neutralized with mineral acids or with organic acids or in quaternized form, the quaternization preferably being effected with dimethyl sulfate, diethyl sulfate, methyl chloride or benzyl chloride.

Sulfo-containing monomers for example vinyl sulfonic acid, allyl sulfonic acid, methallyl sulfonic acid, styrene sulfonic acid or 3-sulfopropyl acrylate, are also suitable as comonomers B).

When basic comonomers B), are used, for example basic acrylates and acrylamides, it is often possible to dispense with hydrolysis of the N-vinylcarboxamides. The copolymers include terpolymers and polymers which additionally contain at least one further monomer as polymerized units.

The abovementioned polymers based on vinylamine units may furthermore contain from 0 to 5 mol-% of polymerized monomer units having at least two ethylenically unsaturated, nonconjugated double bonds. Such comonomers C) are usually used as crosslinking agents in the copolymerization. The presence of these comonomers in the copolymerization results in an increase in the molar masses of the copolymers. Suitable compounds C) are, for example, methylenebisacrylamide, esters of acrylic acid and methacrylic acid with polyhydric alcohols, eg. glycol diacrylate, glyceryl triacrylate, glycol dimethacrylate, glyceryl trimethacrylate and polyols such as pentaerythritol and glucose, which are at least diesterified with acrylic acid or methacrylic acid. Other suitable crosslinking agents are divinylbenzene, divinyldioxane, pentaerythrityl triallyl ether, pentaallylsucrose, divinylurea and divinylethyleneurea.

In particular, copolymers which contain
1) from 1 to 100 mol-% of polymerized vinylamine units,
2) from 0 to 99 mol-% of polymerized monomer units selected from vinyl formate, vinyl acetate, vinyl propionate, N-vinylformamide, vinyl alcohol, acrylonitrile and N-vinylpyrrolidone,
are used for the cationic modification of the starch.

Hydrolyzed homopolymers of N-vinylformamide and copolymers of N-vinylformamide having vinylamine units 1) and further monomer units 2), having a degree of hydrolysis of from 2 to 100, preferably from 30 to 95, mol-%, are preferred.

In the case of copolymers which contain vinyl esters as polymerized units, hydrolysis of the ester groups with formation of vinyl alcohol units occurs in addition to the hydrolysis of the N-vinylformamide units. Polymerized acrylonitrile is likewise chemically modified during the hydrolysis, inter alia amido and/or carboxyl groups being formed.

Furthermore, the cationic polymers may contain aziridines b) of the formula (II) as monomers. Ethyleneimine is preferably used, ie. $R^3$ is preferably hydrogen.

The polymers are then preferably homopolymers, ie. polyethyleneimines, which are obtainable by polymerizing ethyleneimine in the presence of acidic catalysts, such as ammonium bisulfate, hydrochloric acid or chlorinated hydrocarbons, such as methyl chloride, ethylene chloride, carbon tetrachloride or chloroform. Such polyethyleneimines have, for example in 50% strength by weight aqueous solution a viscosity of from about 500 to 33,000, preferably from 1,000 to 31,000 mPa.s (measured according to Brookfield at 20° C. and 20 rpm). The cationic polymers of this group include ethyleneimine-grafted polyamidoamines which, if required, can also be crosslinked by reaction with a bifunctional or polyfunctional crosslinking agent. Products of this type are prepared, for example, by condensation of a dicarboxylic acid, such as adipic acid, with a polyalkylenepolyamine, such as diethylenetriamine or triethylenetetramine, grafting with ethyleneimine and reaction with a bifunctional or polyfunctional crosslinking agent, for example the bischlorohydrin ethers of polyalkylene glycols, and are described, for example, in U.S. Pat. Nos. 4,144,123 and 3,642,572.

Also suitable for the starch modification are polymers which have monomers of the above type c) and contain diallyldialkylammonium compounds as the characteristic monomer unit. Polymers of this type are disclosed, for example, in U.S. Pat. No. 4,146,515. Diallyldimethylammonium chloride is preferably used. Polymers of diallyldimethylammonium chloride are to be understood as meaning primarily homopolymers and copolymers with acrylamide and/or methacrylamide. The copolymerization may be carried out in any desired monomer ratio. The K value of the homo- and copolymers of diallyldimethylammonium chloride is in general at least 30, preferably from 95 to 180.

Other suitable cationic polymers are homo and copolymers of unsubstituted or substituted N-vinylimidazolines d) of the formula (III).

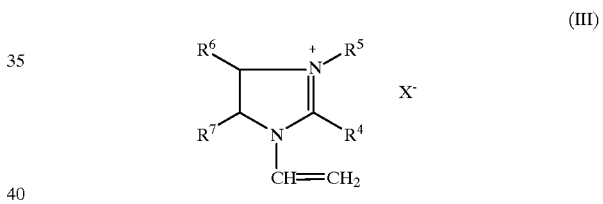

(III)

These may be prepared, for example, by the process of DE-B-11 82 826, where copolymers together with acrylamide and/or methacrylamide may be prepared in an aqueous medium at a pH of from 0 to 8, preferably from 1.0 to 6.8, in the presence of polymerization initiators which decompose into free radicals.

1-Vinyl-2-imidazoline salts of the formula (III), where $R^6$ and $R^7$ are both hydrogen, are preferably used in the polymerization.

The opposite ion $X^-$ in the formula (III) may in principle be any desired acid radical of an inorganic or of an organic acid. The monomers of the formula (III) are obtained by neutralizing the free bases, ie. 1-vinyl-2-imidazolines, with an equivalent amount of an acid. The vinylimidazolines may also be neutralized with, for example, trichloroacetic acid, benzenesulfonic acid or toluenesulfonic acid, in addition to the abovementioned acid radicals. Apart from salts of 1-vinyl-2-imidazolines, other suitable monomers are quaternized 1-vinyl-2-imidazolines. They are prepared by reacting 1-vinyl-2-imidazolines, which may be substituted as described above, with known quaternizing agents. Examples of suitable quaternizing agents are $C_1$–$C_{18}$-alkyl chlorides or bromides, benzyl chloride or bromide, epichlorohydrin, dimethyl sulfate and diethyl sulfate. Epichlorohydrin, benzyl chloride, dimethyl sulfate and methyl chloride are preferably used.

For the preparation of water-soluble homopolymers, the compounds of the formula (III) are preferably polymerized in an aqueous medium.

Preferably used cationic polymers are copolymers of compounds of the formula (III) with acrylamide and/or methacrylamide. These copolymers then contain the compounds of the formula (III) only in effective amounts, ie. in an amount of from 1 to 50, preferably from 10 to 40% by weight. Copolymers of from 60 to 85% by weight of acrylamide and/or methacrylamide and from 15 to 40% by weight of N-vinylimidazoline or N-vinyl-2-methylimidazoline are particularly suitable for modifying natural starch. Copolymers may furthermore be modified by incorporation, by polymerization, of other monomers, such as styrene, N-vinylformamide, vinyl formate, vinyl acetate, vinyl propionate, $C_1$–$C_4$-alkyl vinyl ethers, N-vinylpyridine, N-vinylpyrrolidone, N-vinylimidazole, ethylenically unsaturated $C_3$–$C_5$-carboxylic acids and their esters, amides and nitriles, sodium vinylsulfonate, vinyl chloride and vinylidene chloride, in amounts of, in general, up to 25% by weight. Copolymers which contain, as polymerized units, 1) from 70 to 97% by weight of acrylamide and/or methacrylamide,
2) from 2 to 20% by weight of N-vinylimidazoline or N-vinyl-2-methylimidazoline and
3) from 1 to 10% by weight of N-vinylimidazole are particularly suitable for the modification of natural starches. These copolymers are prepared by free radical copolymerization of the monomers 1), 2) and 3) by known polymerization methods. They have K values of from 80 to 150 (determined according to H. Fikentscher in 5% strength aqueous sodium chloride solution at 25° C. and at a polymer concentration of 0.5% by weight).

Further suitable cationic polymers may contain aminoalkylated esters and amides of acrylic acid and of methacrylic acid of the formula IV, homo- and copolymers being suitable.

Copolymers of from 1 to 99, preferably from 30 to 70 mol-% of acrylamide and/or methacrylamide and from 99 to 1, preferably from 70 to 30 mol-% of dialkylaminoalkyl acrylates and/or methacrylates, for example copolymers of acrylamide and N,N-dimethylaminoethyl acrylate or N,N-diethylaminoethyl acrylate, are preferred. Basic acrylates are preferably present in a form neutralized with acids or in quaternized form. The quaternization may be effected as described above. The cationic polymers have K values of from about 30 to 300, preferably from 100 to 180 (determined according to H. Fikentscher in 5% strength aqueous sodium chloride solution at 25° C. and at a polymer concentration of 0.5% by weight).

Copolymers of from 1 to 99, preferably from 30 to 70 mol-% acrylamide and/or methacrylamide and from 99 to 1, preferably from 70 to 30 mol-% of dialkylaminoalkylacrylamide and/or dialkylaminoalkylmethacrylamide are also suitable. The basic acrylamides and methacrylamide are likewise preferably present in a form neutralized with acids or in quaternized form. Examples are N-trimethylammoniumethylacrylamide chloride, N-trimethylammoniumethylmethacrylamide chloride, trimethylammoniumethylacrylamide methosulfate, trimethylammoniumethylmethacrylamide methosulfate, N-ethyldimethylammoniumethylacrylamide ethosulfate, N-ethyldimethylammoniumethylmethacrylamide ethosulfate, trimethylammoniumpropylacrylamide chloride, trimethylammoniumpropylmethacrylamide chloride, trimethylammoniumpropylacrylamide methosulfate, trimethylammoniumpropylmethacrylamide methosulfat and N-ethyldimethylammoniumpropylacrylamide ethosulfate. Trimethylammoniumpropylmethacrylamide chloride is preferred.

Other suitable cationic polymers are polyallylamines. Polymers of this type are obtained by homopolymerization of allylamine, preferably in a form neutralized with acids or in quaternized form, or by copolymerization of allylamine with other monoethylenically unsaturated monomers, similarly to the copolymers, described above, with N-vinylcarboxamides. Homo- and copolymers of diallyldimethylammonium chloride are preferred.

In the novel process, it is possible to use conventional starches, for example natural starches selected from the group consisting of corn starch, potato starch, wheat starch, rice starch, tapioca starch, sago starch, sorghum starch, cassaba starch, pea starch and mixtures of the stated natural starches. Particularly used starches are those which have an amylopectin content of at least 80% by weight. Such starches can be obtained, for example, by fractionation of conventional natural starches or by culture from plants which produce virtually pure amylopectin starch, as described in Günther Tegge, Stärke und Stärkederivate, Hamburg, Bers-Verlag 1984, pages 157–160. Starches having an amylopectin content of at least 80% by weight are commercially available. They are generally referred to as waxy corn starch, waxy potato starch or waxy wheat starch. In addition to the natural starches, hydrolytically or enzymatically degraded starches are suitable, for example dextrins, such as white or yellow dextrins and maltodextrins, or oxidized starches, such as dialdehyde starch. Chemically modified starches, for example starches esterified with inorganic or organic acids, in particular phosphated and acetylated starches, and starches etherified with organic halogen compounds, epoxides or sulfates, are also suitable. Starches and processes for their degradation and their chemical modification are described in Ullmann's Encyclopedia of Industrial Chemistry, 5th edition, Vol. A25, page 2 et seq., which is hereby incorporated by reference. The starches mentioned above may be used separately or as mixtures, respectively.

The present invention furthermore relates to the use of the starches, modified with cationic polymers and digested according to the invention, as dry and wet strength agents and as drainage aids and retention aids for paper, board and cardboard. They are generally added to the paper stock in an amount of from 0.5 to 3.5, preferably from 1.2 to 2.5, % by weight, based on dry paper stock. The pH of the starch solution is from 2.0 to 9.0, preferably from 2.5 to 8.0. At a solids concentration of 3.5% by eight, the solution of the strength agent in water has a viscosity of from 50 to 10,000, preferably from 80 to 3000, mPa.s, measured in a Brookfield viscometer at 20 rpm and at 200C.

The novel dry strength agents can be used in the production of all known paper, board and cardboard qualities, for example writing, printing and packaging papers. The papers may be produced from a large number of different fiber materials, for example from sulfite or sulfate pulp in the bleached or unbleached state, groundwood, waste paper, thermomechanical pulp (TMP) and chemothermomechanical pulp (CTMP). The pH of the stock suspension is from 4 to 10, preferably from 6 to 8.5. The dry strength agent may be used both in the production of base paper for papers having a low basis weight (LWC papers) and for cardboard. The basis weight of the papers is from 30 to 200, preferably from 35 to 150 $g/m^2$, while that of cardboard may be up to 600 $g/m^2$. Compared with papers produced in the presence of an equal amount of natural starch, the paper products produced according to the invention have markedly improved strength, which can be quantitatively determined, for example, on the basis of the breaking length, the bursting pressure, the CMT value and the tear strength.

The present invention furthermore relates to the papers, boards and cardboards strengthened by the addition of the polymer-modified starches described above.

The nonrestrictive examples which follow illustrate the invention.

EXAMPLES

In the examples which follow, parts and percentages are by weight.

The viscosities of the strength agent were determined in an aqueous solution at a solids concentration of 3.5% by weight and at 20° C. in a Brookfield viscometer at 20 rpm.

The K value of the polymer was determined according to H. Fikentscher, Cellulose Chemie 13 (1932), 58 et seq., in 5% strength sodium chloride solution at 25° C. and at a polymer concentration of 0.5% by weight.

Polymer used for the cationic modification:

Copolymer of 95 mol-% of vinylamine and 5 mol-% of vinylformamide in aqueous solution, pH 7, polymer content: 7.8% by weight, weight average molecular weight about 160,000 g/mol, viscosity 1800 mPas, prepared by hydrolysis of polyvinylformamide, K value 90, with sodium hydroxide solution.

Example 1

1600 g of a 97% strength natural potato starch were thoroughly mixed with 0.3 g of Aerosil® 200 (silica-based flow agent from Degussa) and initially taken in a rotatable glass drum under a nitrogen atmosphere. 250 g of polymer solution were sprayed on with the aid of nitrogen in the course of 45 minutes at room temperature under slightly reduced pressure of about 800 mbar, the drum being rotated uniformly at 140 rpm. 1850 g of cationic potato starch having a solids content of 85% by weight and a charge density of +0.04 meq/g (potassium polyvinylsulfate) resulted. The starch modified in this manner was then digested in a laboratory jet digester at 120° C.

Example 2

1600 g of an 80% strength natural potato starch were initially taken under a nitrogen atmosphere in a rotatable glass drum and heated to 120° C. With uniform rotation of the drum at 140 rpm, 350 g of polymer solution were sprayed on with the aid of nitrogen in the course of 3 hours under slightly reduced pressure of about 800 mbar. Residual amounts of water were removed by distillation during the reaction. 1440 g of cationic potato starch having a solids content of 93% by weight and charge density of +0.02 meq/g (potassium polyvinylsulfate) resulted. The starch modified in this manner was then digested in a laboratory jet digester at 120° C.

Example 3 (comparison)

Natural potato starch according to Example 1 was digested in a laboratory jet digester at 120° C. 15% by weight of a polymer solution (=1.17% by weight of polymer) were added to the starch. The starch modified in this manner had a charge density of +0.05 meq/g (potassium polyvinylsulfate).

Example 4 (comparison)

Natural potato starch according to Example 1 without a cationizing agent and with a charge density of −0.04 meq/g (poly-DADMAC, DADMAC=diallyldimethylammonium chloride), was digested in a laboratory jet digester at 120° C.

Example 5 (comparison)

Commercial cationic starch HI-CAT® (Roquette), charge density +0.29 meq/g (potassium polyvinylsulfate).

Use Examples

In each case 2% (solid) of the starches according to Examples 1 to 5 were added to a paper stock suspension consisting of 40% deinked newsprint, 40% of newsprint which had not been deinked and 20% of bleached sulfite pulp and having a consistency of 0.76% by weight.

1) After the addition of the starch, the fibers were filtered off and COD values of the filtrate were determined according to DIN 38 409.
2) The paper stock was drained on a Schopper-Riegler apparatus and the drainage time (DT) according to DIN ISO 5267 was determined.
3) Paper sheets have a basis weight of 120 g/m² were produced from the stock on a Rapid-Körthen sheet former, after the addition of the starch. The strength of these sheets was tested. Dry bursting pressure (DBP, DIN 2758), flat crush strength (CMT=Concora Medium Test, DIN EN 23035=ISO 3035) and dry breaking strength (DBS, DIN ISO 1924) were determined by standard methods.

The results of the performance tests are shown in the table below.

| Example | COD (mg/l) | DT (s/500 ml) | DBP (kPa) | CMT (N) | DBS (m) |
| --- | --- | --- | --- | --- | --- |
| 0 value | 147 | 102 | 167 | 131 | 2785 |
| 1 | 197 | 116 | 201 | 174 | 3329 |
| 2 | 130 | 86 | 211 | 180 | 3298 |
| 3 | 214 | 114 | 200 | 172 | 3221 |
| 4 | 255 | 117 | 181 | 151 | 3034 |
| 5 | 158 | 115 | 210 | 170 | 3345 |

The novel Examples 1 and 2 show that the paper stock is drained substantially more rapidly as a result of the addition of potato starch modified in the solid state with cationic polymer. Moreover, such starches result in a significant improvement in the strength of the paper compared with Comparative Examples 3 to 5.

We claim:

1. A process for the preparation of a starch which is modified with at least one cationic polymer, comprising:

applying to a dry, free-flowing starch at least one cationic polymer, wherein the cationic polymer is a partially or completely hydrolyzed homo- or copolymer of N-vinylcarboxamides, a homo- or copolymer of N-vinylimidazoles or a polyalkyleneimine, and wherein the cationic polymer is applied without the starch particles sticking together.

2. A process as claimed in claim 1, wherein a finely divided solution of the cationic polymer is added to the starch powder with simultaneous mixing.

3. A process as claimed in claim 1, wherein the starch is modified with the polymer in a weight ratio of from 1:0.0005 to 1:2.

4. A process as claimed in claim 1, wherein the starch is modified with the polymer in a weight ratio of from 1:0.001 to 1:1.

5. A process as claimed in claim 1, wherein the polymer-modified starch powder is dried.

6. A process as claimed in claim 1, wherein the modification and drying of the modified starch are carried out at from 10 to 130° C. and at from 0.001 to 21 bar.

7. A process as claimed in claim 5, wherein the modification and drying of the modified starch are carried out from 10 to 130° C. and at from 0.1 to 1 bar.

8. A process as claimed in claim 5, wherein the modification and drying of the modified starch are carried out at from 20 to 100° C. and at from 0.001 to 1 bar.

9. A process as claimed in claim 5, wherein the modification and drying of the modified starch are carried out at from 20 to 100° C. and at from 0.01 to 1 bar.

10. A process as claimed in claim 1, wherein the modified starch is digested at elevated temperatures and/or superatmospheric pressure and/or under the action of shear forces and, if required, with the introduction of additives.

11. A process as claimed in claim 1, wherein the cationic polymer contains ammonium or amino groups.

12. A starch modified with a cationic polymer and obtainable by a process as claimed in claim 1, in digested or undigested form.

13. A process for the production of paper, board and cardboard, wherein the digested polymer-modified starch as claimed in claim 12 is used as a dry strength agent, wet strength agent, as a drainage aid and/or retention aid.

14. A paper, board or cardboard, strengthened by the addition of the digested, polymer-modified starch as claimed in claim 12.

* * * * *

UNITED STATES PATENT AND TRADEMARK OFFICE
CERTIFICATE OF CORRECTION

PATENT NO. : 6,160,050
DATED : December 12, 2000
INVENTOR(S) : Manfred Niessner et al.

Page 1 of 1

It is certified that error appears in the above-identified patent and that said Letters Patent is hereby corrected as shown below:

<u>Column 15,</u>
Line 5, "21" should read -- 2 --.
Line 14, "0.01" should read -- 0.1 --.

Signed and Sealed this

Sixteenth Day of October, 2001

Attest:

*Nicholas P. Godici*

*Attesting Officer*

NICHOLAS P. GODICI
*Acting Director of the United States Patent and Trademark Office*